(12) United States Patent
Heiland

(10) Patent No.: US 8,281,911 B2
(45) Date of Patent: Oct. 9, 2012

(54) ACTIVE VIBRATION ISOLATION SYSTEM WHICH IS MORE EFFECTIVE AGAINST SEISMIC VIBRATION

(75) Inventor: Peter Heiland, Raunheim (DE)

(73) Assignee: Integrated Dynamics Engineering GmbH (DE)

(*) Notice: Subject to any disclaimer, the term of this patent is extended or adjusted under 35 U.S.C. 154(b) by 980 days.

(21) Appl. No.: 11/758,413

(22) Filed: Jun. 5, 2007

(65) Prior Publication Data

US 2007/0284794 A1  Dec. 13, 2007

(30) Foreign Application Priority Data

Jun. 10, 2006  (EP) .................................... 06011993

(51) Int. Cl.
*F16F 9/00* (2006.01)
(52) U.S. Cl. ..................... 188/379; 267/136; 267/140.14
(58) Field of Classification Search .......... 188/378–379; 267/136, 140.14
See application file for complete search history.

(56) References Cited

U.S. PATENT DOCUMENTS

| 5,899,443 A | 5/1999 | Su |
| 2003/0168574 A1 * | 9/2003 | Watanabe et al. ............. 248/638 |

FOREIGN PATENT DOCUMENTS

| EP | 1 304 499 A1 | 4/2003 |
| JP | 5011856 A | 1/1993 |
| JP | 5-99271 | 4/1993 |
| JP | 5-263868 | 10/1993 |
| JP | 10-132018 | 5/1998 |
| JP | 2000-082662 A | 3/2000 |
| JP | 2002-031187 A | 1/2002 |
| WO | 99/57452 | 11/1999 |

OTHER PUBLICATIONS

"Japanese Office Action for Japanese Patent Application No. 2007-152206", Aug. 25, 2010, Publisher: Japanese Patent Office, Published in: JP.

* cited by examiner

*Primary Examiner* — Bradley King

(74) *Attorney, Agent, or Firm* — Kaplan Breyer Schwarz & Ottesen, LLP

(57) ABSTRACT

The invention relates to an active vibration isolation system in which at least one sensor is provided for detection of ground vibration, and the system has a control device which calculates compensation signals in at least two degrees of freedom, based on movements of the ground.

19 Claims, 3 Drawing Sheets

ACTIVE VIBRATION ISOLATION SYSTEM WHICH IS MORE EFFECTIVE AGAINST SEISMIC VIBRATION

FIELD OF THE INVENTION

The invention relates to an active vibration isolation system and to a method for controlling an active vibration isolation system. In particular, the invention relates to the control of actuators which act on the load to be isolated of an active vibration isolation system.

BACKGROUND OF THE INVENTION

Vibration isolation systems are known and are required in many fields of technology, in particular in the semiconductor industry. For example, European Patent Specification EP 927380 B1 discloses a vibration isolation system in which a lithography appliance is mounted on air bearings in order to isolate it from vibration.

Vibration isolation systems with active control are provided in order to improve the effectiveness of such vibration isolation systems. In this case, the position of the load to be isolated is generally detected via a sensor and, in the event of position changes, compensation signals are generated via actuators which act on the load to be isolated, or by control of the pressure of the air bearings, thus considerably improving the isolation effect of the system.

It has been found that seismic vibration in particular, that is to say vibration which is injected into the system via the ground and the base of the vibration isolation system, cannot be optimally isolated. For example, a sensor which is arranged on the mass to be isolated does not detect the vibration until this has already led to a change in the position of the load to be isolated.

On the other hand, sensors arranged on the ground are often not very suitable for controlling the vibration isolation system, since there is often no match in the association between the spatial directions recorded on the ground and the direction in which the actuators which are arranged on the isolating mass act. In particular, the movement direction of the ground often does not match the direction of the resultant movement of the load to be isolated.

OBJECT OF THE INVENTION

In contrast, the invention is based on the object of providing a vibration isolation system and a method for controlling a vibration isolation system, in which the disadvantages of the prior art as mentioned above are reduced.

One particular object of the invention is to provide a reliable method for controlling a vibration isolation system, in which active compensation is provided for seismic vibration without in principle having first of all to wait for a change in the position of the load to be isolated. A further object of the invention, based on seismic vibration, is to generate compensation signals which take account not only of the movement vector of the vibration but also of resultant movements of the mass to be isolated in other directions.

SUMMARY OF THE INVENTION

The object of the invention is achieved simply by an active vibration isolation system and by a method for controlling an active vibration isolation system as claimed in one of the independent claims.

Preferred embodiments and developments of the invention are specified in the respective dependent claims.

A vibration isolation system is accordingly provided which comprises at least one actuator which acts on the load to be isolated. The actuator preferably acts in a non-contacting manner on the mass to be isolated.

In particular, it is possible to use actuators which act magnetically, electrostatically or piezoelectrically. For the purposes of the invention, the actuator may also be part of a bearing for the vibration isolation system, for example of an air bearing.

The actuator or actuators is or are connected to at least one control device. The control device generates compensation signals, actively counteracting the vibration of the vibration isolation system.

The vibration isolation system according to the invention has at least one sensor for detection of vibration of the ground and/or of the base of the vibration isolation system on which the system is arranged. The sensor which detects movements, in particular vibration, may be a position, acceleration or velocity sensor by means of whose signal a movement can be determined.

The sensor detects movements in at least one degree of freedom, and in this case it or they may be translational or else rotary degrees of freedom.

The signal from the sensor is passed to the control device. The control device has means to calculate compensation signals in at least two degrees of freedom on the basis of the signals from the sensor.

The invention thus makes it possible to convert a signal from the sensor representing a movement of the ground in one direction such that it allows determination of a change in the position of the load to be isolated in at least one further degree of freedom, as well.

Since the resultant movement of the load to be isolated does not always match the movement direction of the ground or of the base of vibration isolation system, this therefore results in a considerably better isolation effect.

In one preferred embodiment of the invention, the control device has means to calculate compensation signals in at least three degrees of freedom, preferably six degrees of freedom.

For example, it is thus possible to provide a system in which the control device calculates compensation signals in all three translation degrees of freedom, that is to say the system generates compensation signals for all three spatial directions.

The three rotation degrees of freedom are preferably also taken into account, so that the control device generates compensation signals in six degrees of freedom.

In one preferred embodiment of the invention, sensors and/or actuators which act in at least one, preferably two, and particularly preferably three translation degrees of freedom are provided.

In a further preferred embodiment of the invention, sensors and/or actuators which act in at least one, preferably two and particularly preferably three rotation degrees of freedom are alternatively or additionally provided.

In one development of the invention, the control device has at least one memory for storing a calculation rule, in particular a transformation matrix.

The resultant movements of the load to be isolated in response to a stimulus resulting from seismic vibration can be calculated by means of a calculation rule which, in particular, is in the form of a transformation matrix. The active control therefore calculates compensation signals on the basis of sensor signals which represent the movement of the ground. This prevents any corresponding movement of the load to be isolated occurring whatsoever, or a resultant movement of the load to be isolated is at least reduced.

In one development of the invention, the control device has a memory for storage of characteristics and/or families or characteristics which represent the reaction of the load to be isolated to vibration.

Families of characteristics such as these may in particular represent the different reaction of the system for different constraints, in particular in the event of changes to the load to be isolated. The system therefore adapts itself automatically to changes in the constraints.

One development of the invention also provides for the characteristics or families of characteristics to be updated during operation. For example, the calculation rule can be automatically matched to changes in the constraints.

In a further preferred embodiment of the invention, the vibration isolation system has at least one further sensor for detection of vibration of the load to be isolated.

This further sensor is used to detect the position of the load to be isolated, and likewise generates compensation signals for vibration suppression, via the control device. In this case, those compensation signals which are intended to counteract the seismic vibration are preferably added to the remaining compensation signals.

The invention also relates to a method for controlling an active vibration isolation system in which vibration of the ground or of the base on which the vibration isolation system is arranged is detected in at least one degree of freedom. Compensation signals for the load to be isolated are generated in at least one further degree of freedom, and the compensation signals are passed to an actuator which acts at least in the further degree of freedom.

This means that the effect in other directions on the load to be isolated, in addition to movement direction and/or the rotation direction of the vibration, is taken into account.

Vibration of the ground or of the base is preferably detected in at least three translation degrees of freedom and/or three rotation degrees of freedom.

Compensation signals are likewise preferably calculated in three translation degrees of freedom and/or rotation degrees of freedom.

The compensation signals are preferably added to further compensation signals for active control.

BRIEF DESCRIPTION OF THE DRAWINGS

The invention will be explained in more detail in the following text with reference to the drawings, in FIG. 1 to FIG. 3, in which.

DETAILED DESCRIPTION OF THE DRAWINGS

Figure 1:
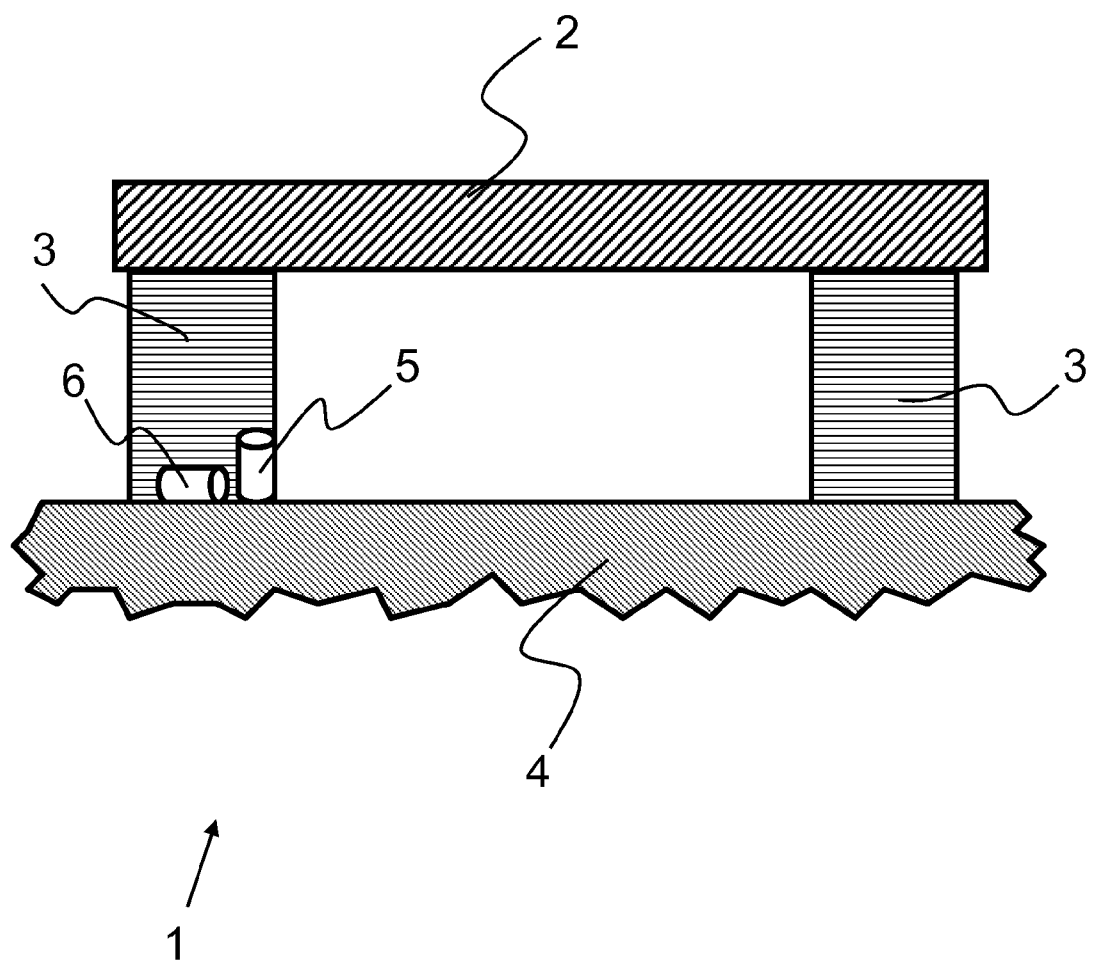
FIG. 1 shows a schematic side view of one exemplary embodiment of a vibration isolation system.

The major components of a vibration isolation system 1 will be explained in more detail with reference to FIG. 1. The vibration isolation system 1 comprises a mass 2 to be isolated, in this case in the form of a table, on which further assemblies such as machine elements (not illustrated) can be mounted such that they are isolated against vibration. The mass 2 to be isolated is mounted on the ground 4 via isolators 3, such that it is isolated against vibration. In this exemplary embodiment, the isolators 3 are air bearings which are likewise also included in the active control (not illustrated). For this purpose, a control device has means for controlling the air supply (not illustrated).

In this exemplary embodiment, vibration is detected by arranging a vertically acting sensor 5 and a horizontal acting sensor 6 in the base of the isolator 3.

Vibration of the ground is detected via these sensors 5, 6. For this purpose, the sensors 5, 6 in this exemplary embodiment are attached to the isolator part which is firmly connected to the ground (not shown in detail).

Figure 2:
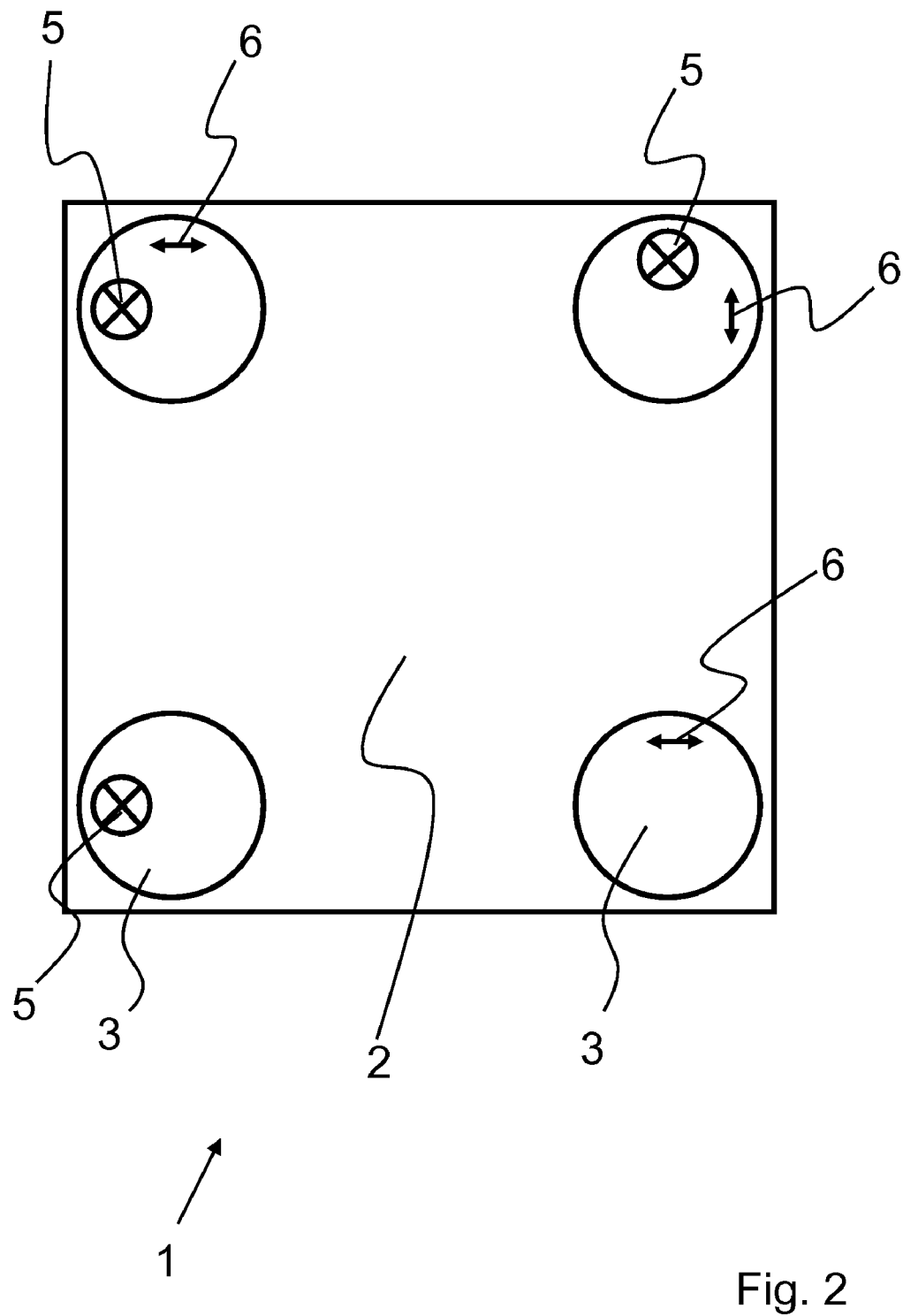
FIG. 2 shows, schematically, the plan view of a vibration isolation system.

FIG. 2 shows, schematically, a plan view of a vibration isolation system 1 such as this. The load 2 to be isolated is mounted on a total of four isolators 3, in this case in the form of air bearings. Horizontally acting sensors 6 for detection of movements on the ground plane are arranged in the base of the isolators 3.

Vibration or movements of the ground in all three spatial directions can be detected via additional vertical sensors 5.

The control of a vibration isolation system such as this will be explained in more detail with reference to FIG. 3.

This shows the active control for one degree of freedom. The signal from a horizontally acting sensor 5, which detects a translation movement in one spatial direction, is passed to a control device 7. At the same time, the control device 7 is connected to a further sensor 8, which detects vibration of the load 2, to be isolated.

The control device 7 uses the signal from the horizontally acting sensor 5 to calculate compensation signals which are added to further compensation signals based on signals from the sensor 8 which is arranged on the load to be isolated.

This compensation signal is passed to the actuators 9, 10. In addition to an actuator 9 which acts in the vertical direction, a further actuator 10 is illustrated, which acts in the horizontal direction.

When calculating compensation signals, the control device 7 accesses a transformation matrix via which the effects of movements of the ground on other degrees of freedom are also taken into account. For example, compensation signals are also added to the further actuator 10, which acts in the horizontal direction.

Figure 3:
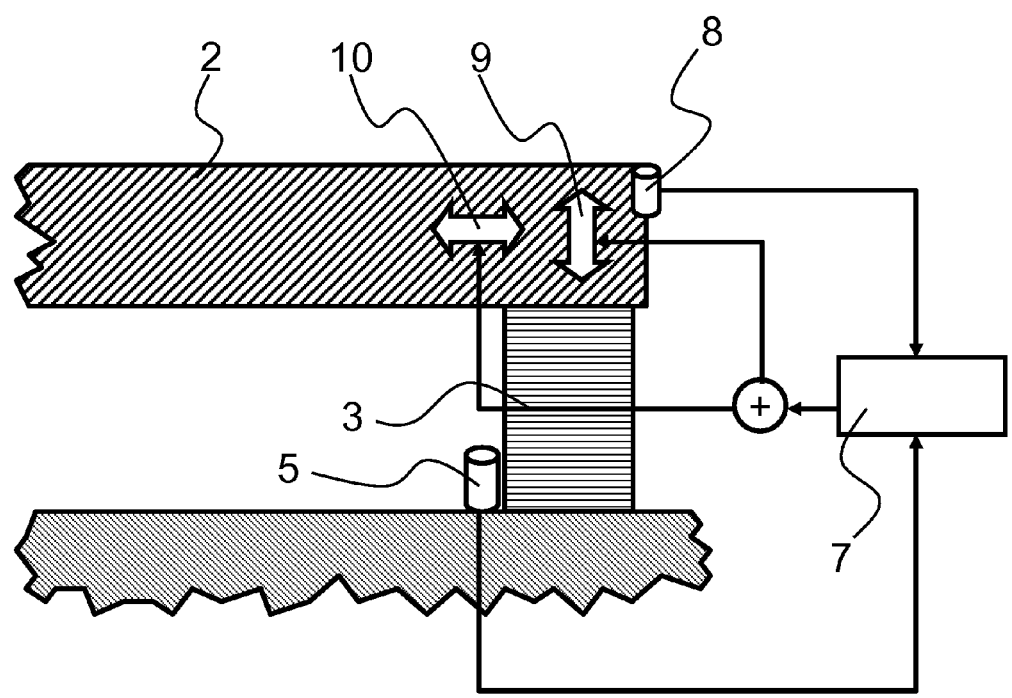
FIG. 3 shows, schematically, the control of a vibration isolation system, with the control being illustrated for only one degree of freedom.

The illustration in FIG. 3 shows only the control with one sensor 5 for one degree of freedom.

However, the invention preferably covers independent control of all six degrees of freedom. In this case, the movements of the ground are calculated by means of a transformation matrix such that the effect of all six degrees of freedom of the mass to be isolated is taken into account, and compensation signals can therefore likewise be generated in all six degrees of freedom, and can be added as additional compensation signals to the active control. The sensor signals are digitized by a digital regulator, and are converted by means of the transformation matrix to the six degrees of freedom of the mass to be isolated.

It is thus possible to provide a vibration isolation system which is considerably more effective against seismic vibration.

It is self-evident that the invention is not restricted to a combination of the features described above, but that a person skilled in the art would in fact combine the features as required, where this is worthwhile.

What is claimed is:

1. An active vibration isolation system, comprising:
an air bearing for supporting a load to be isolated;
a first sensor for detecting, in a first degree of freedom, vibration on the ground on which the active vibration isolation system is arranged, wherein the first sensor for detecting the vibration on the ground is a velocity sensor;

a second sensor for detecting vibration on the load to be isolated;

a control device for calculating compensation signals in at least two degrees of freedom for the load to be isolated, the compensation signals being based on the vibration detected in the first degree of freedom, wherein the first sensor and the second sensor are signally connected to the control device, and wherein the compensation signals are added by the control device to additional compensation signals that are based on the vibration detected by the second sensor; and an actuator for acting on the load to be isolated based on the added compensation signals, wherein the control device is signally connected to the actuator.

2. The active vibration isolation system as claimed in claim 1, wherein the control device has means to calculate compensation signals in at least three degrees of freedom.

3. The active vibration isolation system as claimed in claim 1, wherein the first sensor acts in at least one translational degree of freedom.

4. The active vibration isolation system as claimed in claim 1, wherein the first sensor acts in at least one rotational degree of freedom.

5. The active vibration isolation system as claimed in claim 1, wherein the control device has at least one memory for storing a calculation rule, and wherein the calculation rule is a transformation matrix that is accessed by the control device to calculate the compensation signals.

6. The active vibration isolation system as claimed in claim 1, wherein the control device has at least one memory for storing characteristics and/or families of characteristics that represent a reaction of the load to be isolated from stimuli.

7. A method for controlling an active vibration isolation system, the method comprising:

supporting a load to be isolated by means of an air bearing;

detecting, by a first sensor, in at least one degree of freedom, vibration of the ground on which the active vibration isolation system is arranged, wherein the first sensor for detecting the vibration on the ground is a velocity sensor;

detecting, by a second sensor, vibration on the load to be isolated;

generating compensation signals for controlling actuators in at least two degrees of freedom for the load to be isolated, the compensation signals being based on the vibration detected in the at least one degree of freedom;

generating additional compensation signals that are based on the vibration detected by the second sensor;

adding the compensation signals and the additional compensation signals; and passing the added compensation signals to the actuators.

8. The method for controlling an active vibration isolation system as claimed in claim 7, wherein vibration of the ground is detected by the first sensor in a translational degree of freedom.

9. The method for controlling an active vibration isolation system as claimed in claim 7, wherein vibration of the ground is detected by the first sensor in a rotational degree of freedom.

10. The method for controlling an active vibration isolation system as claimed in claim 7, further comprising accessing a calculation rule stored in a memory of the control device, wherein the calculation rule is a transformation matrix for calculating the compensation signals.

11. The method for controlling an active vibration isolation system as claimed in claim 7, wherein characteristics and/or families of characteristics that represent a reaction of the load to be isolated to a stimulus are recorded.

12. The method for controlling an active vibration isolation system as claimed in claim 11, wherein the compensation signals are calculated including the families of characteristics and/or characteristics.

13. An active vibration isolation system, comprising:

an air bearing for supporting a load to be isolated;

a first sensor for generating a first signal in response to detecting, in a first degree of freedom, vibration on the ground on which the active vibration isolation system is arranged, wherein the first sensor for detecting the vibration on the ground is a velocity sensor;

a second sensor for generating a second signal in response to detecting vibration on the load to be isolated;

a memory for storing a calculation rule;

a control device for calculating, based on the first signal and the calculation rule, compensation signals in at least two degrees of freedom for the load to be isolated, wherein the compensation signals are added by the control device to additional compensation signals that are based on the second signal; and an actuator for acting on the load to be isolated based on the added compensation signals, wherein the actuator, the first sensor, and the second sensor are signally connected to the control device.

14. The active vibration isolation system as claimed in claim 13, wherein the control device has means to calculate compensation signals in six degrees of freedom.

15. The active vibration isolation system as claimed in claim 13, wherein the first sensor acts in at least one translational degree of freedom.

16. The active vibration isolation system as claimed in claim 13, wherein the first sensor acts in at least one rotational degree of freedom.

17. The active vibration isolation system as claimed in claim 13, wherein the calculation rule stored in the memory is a transformation matrix that is accessed by the control device to calculate the compensation signals.

18. The active vibration isolation system as claimed in claim 13, wherein the memory of the control device is also for storing characteristics and/or families of characteristics that represent a reaction of the load to be isolated from stimuli.

19. The active vibration isolation system as claimed in claim 13, further comprising a third sensor for detecting vibration on the ground on which the active vibration isolation system is arranged, wherein:

(i) the first sensor is a vertically acting sensor, and
(ii) the third sensor is a horizontally acting sensor.

* * * * *